(12) United States Patent
Pearson et al.

(10) Patent No.: US 7,105,688 B2
(45) Date of Patent: Sep. 12, 2006

(54) ETHYLENICALLY-UNSATURATED RED ANTHRAQUINONE DYES

(75) Inventors: Jason Clay Pearson, Kingsport, TN (US); Max Allen Weaver, Kingsport, TN (US); Jean Carroll Fleischer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 240 days.

(21) Appl. No.: 10/647,828

(22) Filed: Aug. 25, 2003

(65) Prior Publication Data

US 2005/0049425 A1   Mar. 3, 2005

(51) Int. Cl.
*C09B 1/00* (2006.01)
*C09B 1/16* (2006.01)

(52) U.S. Cl. .......................... 552/241; 552/242; 8/675

(58) Field of Classification Search ............... 552/241, 552/242; 8/675
See application file for complete search history.

(56) References Cited

U.S. PATENT DOCUMENTS

| | | | |
|---|---|---|---|
| 2,640,062 A | 5/1953 | Seymour et al. |
| 2,773,071 A | 12/1956 | Pizzarello et al. |
| 3,072,683 A | 1/1963 | Straley et al. |
| 3,324,150 A | 6/1967 | Straley et al. |
| 3,445,485 A | 5/1969 | Straley |
| 3,467,681 A | 9/1969 | Hederich et al. |
| 3,530,150 A | 9/1970 | Rickenbacher |
| 3,642,835 A | 2/1972 | Hederich et al. |
| 3,694,467 A | 9/1972 | Maier |
| 3,769,305 A | 10/1973 | Kölliker et al. |
| 3,822,992 A | 7/1974 | Hederich et al. |
| 3,963,763 A | 6/1976 | Hederich et al. |
| 4,110,072 A | 8/1978 | Fitzpatrick et al. |
| 4,115,056 A | 9/1978 | Koller et al. |
| 4,943,617 A | 7/1990 | Etzbach et al. |
| 5,055,602 A | 10/1991 | Melpolder |
| 5,109,097 A | 4/1992 | Klun et al. |
| 5,362,812 A | 11/1994 | Holmes et al. |
| 5,367,039 A | 11/1994 | Yabuuchi et al. |
| 5,578,419 A * | 11/1996 | Itoh et al. ................ 430/281.1 |
| 5,900,445 A | 5/1999 | Chandler et al. |

FOREIGN PATENT DOCUMENTS

| | | |
|---|---|---|
| EP | 0 322 808 | 7/1989 |
| WO | WO 96/01283 | 1/1996 |
| WO | WO 97/48744 | 12/1997 |
| WO | WO 02/12401 | 2/2002 |
| WO | WO 02/12401 A2 * | 2/2002 |
| WO | WO 02/12403 | 2/2002 |

OTHER PUBLICATIONS

Asquith et al., Journal of the Society of Dyers and Colourists, Apr. 1977, pp. 114-125.

* cited by examiner

*Primary Examiner*—Barbara P. Badio
(74) *Attorney, Agent, or Firm*—Brett L. Nelson; Bernard J. Graves, Jr.

(57) ABSTRACT

This invention pertains to certain novel red anthraquinone colorant compounds containing one or more ethylenically-unsaturated (e.g., vinyl), photopolymerizable radicals that may be copolymerized (or cured) with ethylenically-unsaturated monomers to produce colored compositions such as colored acrylic polymers. Suitable compositions having the present colorants copolymerized therein include, e.g., polymers produced from acrylate and methacrylate esters, colored polystyrenes, and similar colored polymeric materials derived from other ethylenically-unsaturated monomers. The novel colorants possess good fastness (stability) to ultraviolet (UV) light, good solubility in vinyl monomers and good color strength. The present invention also pertains to processes for preparing the photopolymerizable colorant compounds. The ethylenically unsaturated colorant compounds may be suitable for use in coatings that are applied to wood, glass, paper, metal, thermoplastics and the like.

17 Claims, No Drawings

ETHYLENICALLY-UNSATURATED RED ANTHRAQUINONE DYES

FIELD OF THE INVENTION

This invention pertains to certain novel red colorant compounds which contain one or more ethylenically-unsaturated (vinyl), photopolymerizable radicals that may be copolymerized (or cured) with ethylenically-unsaturated monomers to produce colored compositions such as colored acrylic polymers, e.g., polymers produced from acrylate and methacrylate esters, colored polystyrenes, and similar colored polymeric materials derived from other ethylenically-unsaturated monomers. The novel colorant compounds possess good fastness (stability) to ultraviolet (UV) light, good solubility in vinyl monomers and good color strength. The present invention also pertains to processes for preparing certain of the photopolymerizable colorant compounds. The ethylenically unsaturated colorant compounds may be suitable for use in coatings that are applied to wood, glass, metal, thermoplastics and the like.

BACKGROUND

Colored polymeric materials may be produced by combining a reactive polymer, such terepolymers having epoxy groups or polyacryloyl chloride, with anthraquinone dyes containing nucleophilic reactive groups such as amino or hydroxy groups. Similarly, acryloylaminoanthraquinone dyes may be grafted to the backbone of vinyl or divinyl polymers. Likewise, anthraquinone dyes containing certain olefinic groups have been polymerized to produce polymeric dyes/pigments. (See, e.g., J.S.D.C., April 1977, pp 114–125).

U.S. Pat. No. 4,115,056 describes the preparation of blue, substituted 1,4-diaminoanthraquinone dyes containing one acryloyloxy group and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, that contain photopolymerizable groups and their use for color filters suitable for use in liquid crystal television sets, color copying machines, photosensitive resist resin compositions, and the like are described in U.S. Pat. No. 5,578,419. The preparation of a variety of anthraquinones dyes which contain photopolymerizable groups are disclosed in U.S. Patent application 20020068725. U.S. Pat. No. 5,900,445 discloses erasable ink compositions containing certain magenta 1-amino,4-hydroxy anthraquinones that are substituted in the 2 position with either thio or amino groups that contain photopolymerizable groups.

The present invention provides economical, photopolymerizable red anthraquinone colorants with improved light stability and solubility in solvents or monomers relative to that known in the art.

SUMMARY OF THE INVENTION

This invention relates to ethylenically unsaturated, photopolymerizable or free radically polymerizable, red anthraquinone colorants of Formula I:

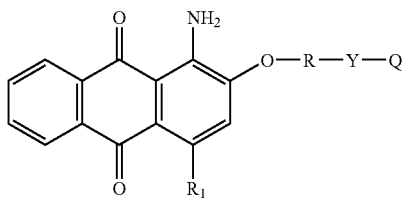

wherein:
R is a divalent linking group selected from the group consisting of —$C_2$–$C_8$-alkylene-, —($C_2$–$C_4$-alkylene-Z)$_n$— $C_2$–$C_4$-alkylene-,   —$C_2$–$C_6$-alkylene-O-arylene-$C_2$–$C_6$-alkylene-, -arylene-O—$C_1$–$C_6$-alkylene-, —$CH_2$-1,4-cyclohexylene-$CH_2$— and -arylene-$C_1$–$C_6$-alkylene-;

Z is —O—, —S—, —N($SO_2R_4$)—, —N($R_3$)CO— or —N($COR_5$)—;

$R_1$ is hydroxy, —$NHSO_2R_2$ or $NHCOR_2$;

$R_2$ is $C_1$–$C_6$-alkyl, $C_3$–$C_8$-cycloalkyl or aryl;

Y is —O— or —N($R_3$)—;

$R_3$ is hydrogen, $C_1$–$C_6$-alkyl, $C_3$–$C_8$-cycloalkyl or aryl;

$R_4$ is $C_1$–$C_6$-alkyl, $C_3$–$C_8$-cycloalkyl or aryl;

$R_5$ is $C_1$–$C_6$-alkyl, $C_1$–$C_6$-alkoxy, $C_3$–$C_8$-cycloalkyl or aryl;

n is an integer from 1 to 3; and

Q is an ethylenically unsaturated, photopolymerizable or free radical initiated polymerizable group.

The present invention also relates to a process for making concentrated solutions of the ethylenically-unsaturated photopolymerizable colorants (e.g., dyes) wherein toluene, methylethyl ketone, acetone, hexanediol diacrylate, tri(propyleneglycol) diacrylate and the like are preferred solvents. The concentration of dye in the solution can be from about 0.5 weight percent (wt %) to about 40 wt %.

The present invention further relates to a coating composition containing the photopolymerizable colorants of Formula I. Preferred coating substrates are thermoplastics, glass, wood, paper, metal and the like, particularly preferred thermoplastics are polyesters, acrylics and polycarbonate.

DETAILED DESCRIPTION OF THE INVENTION

The colorants of the present invention are red. Thus, this invention relates to ethylenically unsaturated, photopolymerizable or free radically polymerizable, red anthraquinone colorants of Formula I:

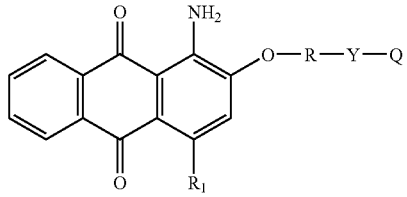

wherein:

R is a divalent linking group selected from the group consisting of —$C_2$–$C_8$-alkylene-, —($C_2$–$C_4$-alkylene-Z)$_n$—$C_2$–$C_4$-alkylene-, —$C_2$–$C_6$-alkylene-O-arylene-O—$C_2$–$C_6$-alkylene-, -arylene-O—$C_1$–$C_6$-alkylene-, —$CH_2$-1,4-cyclohexylene-$CH_2$— and -arylene-$C_1$–$C_6$-alkylene-;

Z is —O—, —S—, —N($SO_2R_4$)—, —N($R_3$)CO— or —N($COR_5$)—;

$R_1$ is hydroxy, —$NHSO_2R_2$ or $NHCOR_2$;

$R_2$ is $C_1$–$C_6$-alkyl, $C_3$–$C_8$-cycloalkyl or aryl;

Y is —O— or —N($R_3$)—;

$R_3$ is hydrogen, $C_1$–$C_6$-alkyl, $C_3$–$C_8$-cycloalkyl or aryl;

$R_4$ is $C_1$–$C_6$-alkyl, $C_3$–$C_8$-cycloalkyl or aryl;

$R_5$ is $C_1$–$C_6$-alkyl, $C_1$–$C_6$-alkoxy, $C_3$–$C_8$-cycloalkyl or aryl;

n is an integer from 1 to 3; and

Q is an ethylenically unsaturated, photopolymerizable or free radical initiated polymerizable group.

The phrase "ethylenically-unsaturated photopolymerizable group" and/or "free radical initiated polymerizable group" will be understood to the person of skill in the art to refer to a moiety having a reactive C=C double bond, including those having a vinyl group; preferably, the reactive double bond is activated by being attached to an aryl group or an electron withdrawing group such as a carbonyl. The phrase "reactive C=C double bonds" does not include the endocyclic conjugated double bonds in an aromatic ring since these bonds are know to be unreactive to free radical polymerization under normal polymerization conditions.

Preferred Q groups include the following organic radicals 1–10:

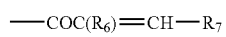 1

 2

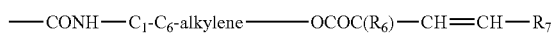 3

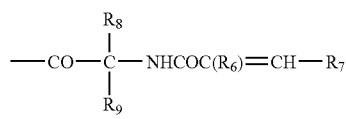 4

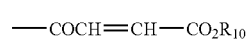 5

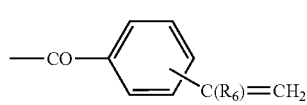 6

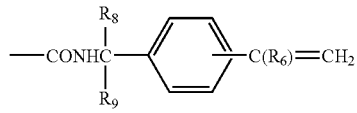 7

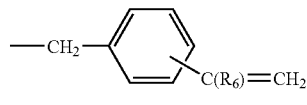 8

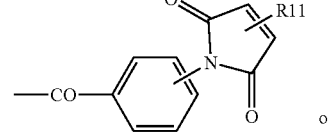 9

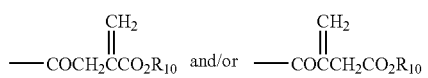 10 wherein:

$R_6$ is hydrogen or $C_1$–$C_6$-alkyl;

$R_7$ is hydrogen; $C_1$–$C_6$-alkyl; phenyl; phenyl substituted with one or more groups selected from the group consisting of $C_1$–$C_6$-alkyl, $C_1$–$C_6$-alkoxy, —N($C_1$–$C_6$-alkyl), nitro, cyano, $C_1$–$C_6$-alkoxycarbonyl, $C_1$–$C_6$-alkanoyloxy and halogen; 1- or 2-naphthyl; 1- or 2-naphthyl substituted with $C_1$–$C_6$-alkyl or $C_1$–$C_6$-alkoxy; 2- or 3-thienyl; 2- or 3-thienyl substituted with $C_1$–$C_6$-alkyl or halogen; 2- or 3-furyl; or 2- or 3-furyl substituted with $C_1$–$C_6$-alkyl;

$R_8$ and $R_9$ are, independently, hydrogen, $C_1$–$C_6$-alkyl, or aryl; or $R_8$ and $R_9$ may be combined to represent a —[—$CH_2$—]$_{3-5}$— radical;

$R_{10}$ is hydrogen, $C_1$–$C_6$-alkyl, $C_3$–$C_8$-alkenyl, $C_3$–$C_8$-cycloalkyl or aryl; and $R_{11}$ is hydrogen, $C_1$–$C_6$-alkyl or aryl.

The term "$C_1$–$C_6$-alkyl" is used herein to denote a straight or branched chain, saturated aliphatic hydrocarbon radical containing one to six carbon atoms and these radicals optionally substituted with one or two groups selected from hydroxy, halogen, cyano, aryl, aryloxy, arylthio, $C_1$–$C_6$ alkylthio, $C_3$–$C_8$-cycloalkyl, $C_1$–$C_6$-alkanoyloxy and —Y—Q. The term "$C_3$–$C_8$-cycloalkyl" is used to denote a saturated, carbocyclic hydrocarbon radical having three to eight carbon atoms, optionally substituted with at least one $C_1$–$C_6$-alkyl group(s). The term "aryl" as used herein denotes phenyl and phenyl substituted with one to three substituents selected from $C_1$–$C_6$-alkyl, $C_1$–$C_6$-alkoxy and halogen. The terms "$C_1$–$C_6$-alkoxy", "$C_1$–$C_6$-alkoxycarbonyl" and "$C_1$–$C_6$-alkanoyloxy" are used to denote radicals corresponding to the structures —$OR_{12}$, —$CO_2R_{12}$ and —$OCOR_{12}$, wherein $R_{12}$ is a $C_1$–$C_6$-alkyl group. The term "$C_3$–$C_8$-alkenyl" is used to denote a hydrocarbon radical having three to eight carbons, straight or branched chained, and that contains at least one carbon-carbon double bond. The term "halogen" is used to include fluorine, chlorine, bromine, and iodine. The terms "$C_2$–$C_8$-alkylene" and "$C_2$–$C_4$-alkylene" are used to denote divalent, straight or branched chain hydrocarbon radicals containing two to eight and two to four carbons, respectively, and these groups optionally substituted with hydroxy, halogen, aryl, aryloxy, $C_1$–$C_6$-alkoxy and —Y—Q. The term "$C_1$–$C_6$-alkylene" is used to denote a divalent, straight or branched chain, hydrocarbon radicals containing one to six carbons. The term "arylene" as used herein denotes includes 1,2-, 1,3- and 1,4-phenylene and such divalent radicals optionally substituted with $C_1$–$C_6$-alkyl, $C_1$–$C_6$-alkoxy or halogen.

The skilled artisan will understand that each of the references herein to groups or moieties having a stated range of carbon atoms, such as "$C_1$–$C_6$-alkyl," includes not only the $C_1$ group (methyl) and $C_6$ group (hexyl) end points, but also each of the corresponding individual $C_2$, $C_3$, $C_4$ and $C_5$ groups. In addition, it will be understood that each of the individual points within a stated range of carbon atoms may be further combined to describe subranges that are inherently within the stated overall range. For example, the term "$C_3$–$C_8$-cycloalkyl" includes not only the individual cyclic moieties $C_3$ through $C_8$, but also contemplates subranges such as "$C_4$–$C_6$-cycloalkyl."

Preferred embodiments of the present invention include colorants of Formula I where Q, is a group having the formula —$COC(R_6)$=$CH_2$ or

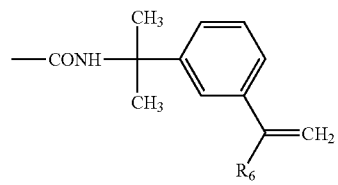

where $R_6$ is hydrogen or methyl.

Further preferred embodiments of the present invention are colorants of Formula I wherein R is —$C_2$–$C_6$-alkylene-, —$C_2$–$C_4$-alkylene-O-arylene-O—$C_2$–$C_4$-alkylene-, —$(C_2H_4O)_n$—$C_2H_4$— or —$CH_2$—1,4-cyclohexylene-$CH_2$—; n is an integer selected from 1 to 3; $R_1$ is hydroxy or —$NHSO_2R_2$; Y is oxygen and Q is

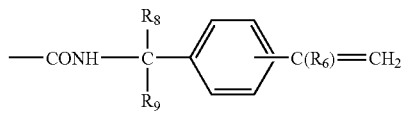

wherein $R_6$ is hydrogen or methyl; and $R_8$ and $R_9$ are methyl. More preferred are colorants of Formula I where R is —$C_2$–$C_6$-alkylene-, —$C_2$–$C_4$-alkylene-O-arylene-O—$C_2$–$C_4$-alkylene-, —$(C_2H_4O)_n$—$C_2H_4$— or —$CH_2$-1,4-cyclohexylene-$CH_2$—; n is an integer from 1 to 3; $R_1$ is hydroxy or —$NHSO_2R_2$; Y is oxygen and Q is —$COC(R_6)$=$CH$—$R_7$ wherein $R_6$ is hydrogen or methyl; and $R_7$ is hydrogen.

The ethylenically unsaturated (e.g., vinyl functionalized) red colorants of Formula I may be prepared by reacting hydroxy or amino substituted intermediate compounds of Formula II

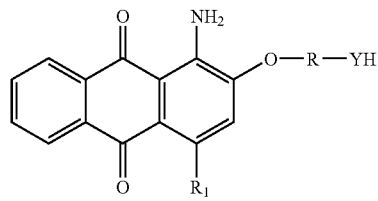

with the acylating or alkylating agents 1' through 10', as follows:

1'

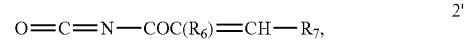

2'

3'

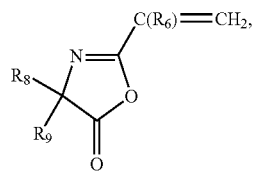

4'

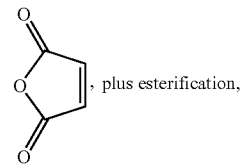

5'

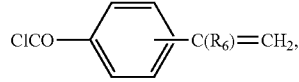

6'

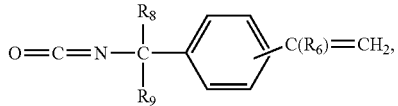

7'

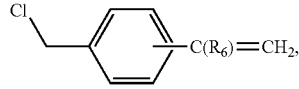

8'

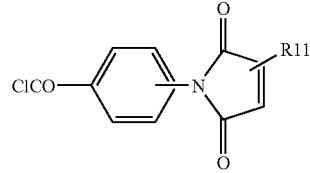

9'

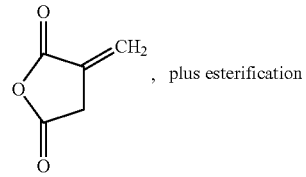

10' wherein $R_6$, $R_7$, $R_8$, $R_9$ and $R_{11}$ are as defined above.

Compounds of Formula II, above, wherein Y is —O— or —N($R_3$)— are known to be useful as disperse dyes and may be prepared by procedures known to those of skill in the art. See, e.g., U.S. Pat. Nos. 2,640,062; 2,773,071; 3,072,683; 3,324,150; 3,445,485; 3,467,681; 3,530,150; 3,642,835; 3,694,467; 3,769,305; 3,822,992; 3,963,763 and 4,110,072.

EXAMPLES

The red anthraquinone colorant compounds provided by the present invention are further illustrated by the following examples:

Example 1

A mixture of 1-amino-4-hydroxy-2-(2'-hydroxyethoxy)anthraquinone (1.12 g, 0.00375 m, C.I. Disperse Red 55 dry cake), 3-isopropenyl-α,α-dimethylbenzyl isocyanate (0.8 g, 0.00375 m), toluene (35 mL) and dibutyltin dilaurate (3 drops) was heated and stirred at 90° C. for about 2 h. The reaction mixture was drowned into heptane (200 mL) with stirring and the red solid was collected by vacuum filtration, washed with heptane and dried in air. The yield of product was quantitative. Field desorption mass spectrometry (FDMS) supported the following structure:

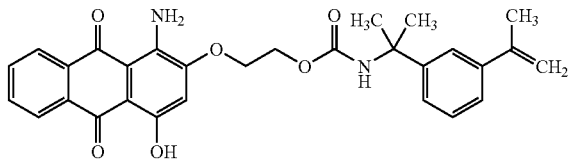

An absorption maximum at 516 nm (extinction coefficient=$2.95 \times 10^4$) was observed in the UV-visible absorption spectrum in N,N-dimethylformamide (DMF) solvent.

Example 2

A mixture of 1-amino-4-hydroxy-2-[2'-[4'-(2'-hydroxyethoxy)phenoxy]ethoxy]anthraquinone (2.17 g, 0.005 m, C.I. Disperse Red 138 dry cake), 3-isopropenyl-α,α-dimethylbenzyl isocyanate (0.1.06 g, 0.005 m), toluene (30.0 mL) and dibutyltin dilaurate (4 drops) was heated and stirred at 95–90° C. for about 2.5 h. Thin-layer chromatography (1:1 tetrahydrofuran:hexane) indicated a small amount of starting material. Additional 3-isopropenyl-α,α-dimethylbenzyl isocyanate (10–12 drops) was added and heating and stirring was continued at 90° C. for another hour. The reaction mixture was allowed to cool to 60° C. and gradually added to heptane (50 mL). The reaction mixture was allowed to cool to ambient temperature and red precipitate was collected by vacuum filtration. The precipitate was washed with heptane and dried in air (yield—3.10 g, 97.5% of the theoretical yield). FDMS supported the following structure:

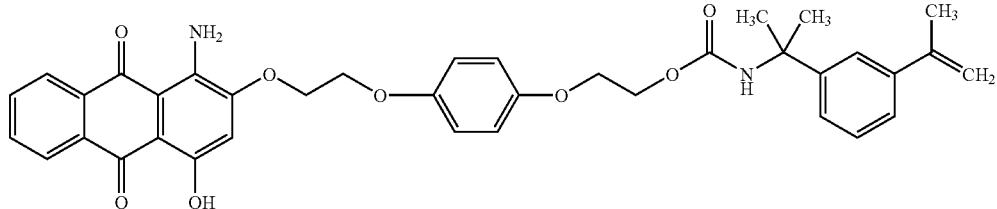

An absorption maximum was observed at 517 nm (extinction coefficient=$1.53 \times 10^4$) nm in the UV-visible absorption spectrum in DMF solvent.

Example 3

1-amino-4-hydroxy-2-[2'-[4'-(2'-hydroxyethoxy)phenoxy]ethoxy]anthraquinone (1.0 g, 0.0023 m, C.I. Disperse Red 138 dry cake), methacrylic anhydride (411 μL, 0.00276 m, 4-dimethylaminopyridine (28 mg, 0.00023 m), hydroquinone (10 mg) were added respectively to a 100 mL round-bottomed flask equipped with a magnetic stir bar that contained DMF (10.0 mL). Triethylamine (385 μL, 0.00276 m) was added dropwise to the stirring reaction solution. The reaction solution was stirred at ambient temperature for 24 h. Methanol (25 mL) was added to the reaction mixture. The reaction mixture was poured into 100 mL of water to precipitate the product, which was collected by vacuum filtration. The precipitate was washed with water and dried in air (yield—1.16 g, 100% of the theoretical yield). FDMS supported the following structure:

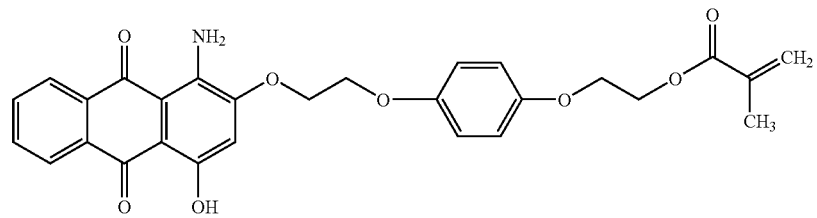

Examples 4–41

The colorants set forth in Table I were prepared according to the general method used to prepare the colorants of Examples 1 through 3. The colorants in Examples 4 through 41 had the following general structure as further defined in Table I.

TABLE I

Olefin Substituted Red Anthraquinone Colorants

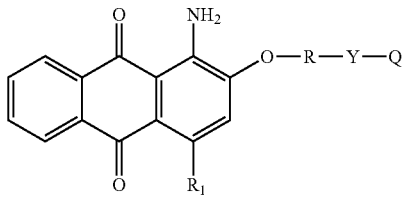

| Example | R | $R_1$ | Y | Q |
|---|---|---|---|---|
| 4 | —$CH_2CH_2$— | —OH | —O— | —$COC(CH_3)$=$CH_2$ |
| 5 | —$(CH_2)_3$— | —OH | —O— | —$COC(CH_3)$=$CH_2$ |
| 6 | —$(CH_2)_4$— | —OH | —O— | —COCH=CH—$CH_3$ |
| 7 | —$(CH_2)_6$— | —OH | —O— | —$COC(CH_3)$=$CH_2$ |
| 8 | —$CH_2CH_2CH(CH_3)$— | —OH | —O— | —$CONHC(CH_3)_2C_6H_4$-3-$C(CH_3)$=$CH_2$ |
| 9 | —$(CH_2)_8$— | —OH | —O— | —$CONHC(CH_3)_2C(CH_3)$=$CH_2$ |
| 10 | —$CH_2CH_2OCH_2CH_2$— | —OH | —O— | —COCH=CH—$C_6H_5$ |
| 11 | —$(CH_2CH_2O)_2$—$CH_2CH_2O$— | —OH | —O— | —COCH=CH-(2-furyl) |
| 12 | —$CH_2CH_2SCH_2CH_2$— | —OH | —O— | —COCH=CH—$CO_2H$ |
| 13 | —$CH_2CH_2N(SO_2C_6H_5)CH_2CH_2$— | —OH | —O— | —$COC(CH_3)$=$CH_2$ |
| 14 | —$CH_2CH_2N(SO_2CH_3)CH_2CH_2$— | —OH | —O— | —$CONHC(CH_3)_2C_6H_4$-3-$C(CH_3)$=$CH_2$ |
| 15 | —$CH_2CH(OCOCH$=$CH_2)CH_2$— | —OH | —O— | —COCH=$CH_2$ |
| 16 | —$CH_2CH_2$— | —OH | —NH— | —$COC(CH_3)$=$CH_2$ |
| 17 | —$(CH_2)_6$— | —OH | —$N(CH_3)$— | —$CONHC(CH_3)_2C_6H_4$-3-$C(CH_3)$=$CH_2$ |
| 18 | —$CH_2$-(1,4-cyclohexylene)-$CH_2$— | —OH | —O— | —$CONHC(CH_3)_2C_6H_4$-3-$C(CH_3)$=$CH_2$ |
| 19 | —(1,4-phenylene)-O-$CH_2CH_2$— | —OH | —O— | —$COC_6H_4$-4-CH=$CH_2$ |
| 20 | —(1,4-phenylene)-$CH_2$— | —OH | —O— | —CO-(4-(N-maleimido)phenyl) |
| 21 | —$CH_2CH_2N(COC_6H_5)CH_2CH_2$— | —OH | —O— | —$CONHCH_2CH_2OCOC(CH_3)$=$CH_2$ |
| 22 | —$CH_2CH_2$— | —$NHSO_2CH_3$ | —O— | —$COC(CH_3)$=$CH_2$ |
| 23 | —$(CH_2)_6$— | —$NHSO_2C_6H_5$ | —O— | —$CONHC(CH_3)_2C_6H_4$-3-$C(CH_3)$=$CH_2$ |
| 24 | —$CH_2CH_2$-O-(1,4-phenylene)-O-$CH_2CH_2$— | —$NHC_4H_9$-n | —O— | —$CONHCOC(CH_3)$=$CH_2$ |
| 25 | —$CH_2CH_2OCH_2CH_2$— | —$NHSO_2C_6H_4$-4-$CH_3$ | —NH— | —COCH=$CH_2$ |
| 26 | —(1,4-phenylene)-O-$CH_2CH_2$— | —$NHSO_2C_6H_{11}$ | —O— | —$COC(CH_3)$=$CH_2$ |
| 27 | —$CH_2CH_2N(C_6H_5)CH_2CH_2$— | —$NHSO_2CH_2C_6H_5$ | —O— | —$CONHC(CH_3)_2C_6H_4$-3-$C(CH_3)$=$CH_2$ |
| 28 | —$CH_2CH_2CH(CH_3)$— | —OH | —O— | —$COC(CH_3)$=$CH_2$ |
| 29 | —$(CH_2)_8$— | —OH | —O— | —$COC(CH_3)$=$CH_2$ |
| 30 | —$CH_2CH_2OCH_2CH_2$— | —OH | —O— | —$COC(CH_3)$=$CH_2$ |

TABLE I-continued

Olefin Substituted Red Anthraquinone Colorants

[Structure: anthraquinone with substituents — position 1: $NH_2$; position 2: $O-R-Y-Q$; position 4: $R_1$; positions 9,10: =O]

| Example | R | $R_1$ | Y | Q |
|---|---|---|---|---|
| 31 | —(CH$_2$CH$_2$O)$_2$—CH$_2$CH$_2$O— | —OH | —O— | —COC(CH$_3$)=CH$_2$ |
| 32 | —CH$_2$CH$_2$SCH$_2$CH$_2$— | —OH | —O— | —COC(CH$_3$)=CH$_2$ |
| 33 | —(CH$_2$)$_6$— | —OH | —N(CH$_3$)— | —COC(CH$_3$)=CH$_2$ |
| 34 | —CH$_2$—(cyclohexyl)—CH$_2$— | —OH | —O— | —COC(CH$_3$)=CH$_2$ |
| 35 | —(phenyl)—O—CH$_2$CH$_2$— | —OH | —O— | —COC(CH$_3$)=CH$_2$ |
| 36 | —(phenyl)—CH$_2$— | —OH | —O— | —COC(CH$_3$)=CH$_2$ |
| 37 | —CH$_2$CH$_2$N(COC$_6$H$_5$)CH$_2$CH$_2$— | —OH | —O— | —COC(CH$_3$)=CH$_2$ |
| 38 | —(CH$_2$)$_6$— | —NHSO$_2$C$_6$H$_5$ | —O— | —COC(CH$_3$)=CH$_2$ |
| 39 | —CH$_2$CH$_2$—O—(phenyl)—O—CH$_2$CH$_2$— | —NHC$_4$H$_9$-n | —O— | —COC(CH$_3$)CH$_2$ |
| 40 | —CH$_2$CH$_2$— | —NHSO$_2$C$_6$H$_4$-4-CH$_3$ | —O— | —COC(CH$_3$)=CH$_2$ |
| 41 | —CH$_2$CH$_2$— | —NHSO$_2$C$_6$H$_4$-4-CH$_3$ | —O— | —CONHC(CH$_3$)$_2$C$_6$H$_4$-3-C(CH$_3$)=CH$_2$ |

As stated above, the present invention also relates to a process for making concentrated solutions of red dyes in a suitable solvent. Suitable solvents include aromatics, ketones, acrylates, methacrylates, styrenes and the like. In the concentrates of the present invention, toluene, methylethyl ketone, acetone, hexanediol diacrylate, tri(propyleneglycol) diacrylate and mixtures thereof are preferred solvents. The concentration of dye in the solution can be from about 0.5 weight percent (wt %) to about 40 wt % and is preferably from about 10 wt % to about 30 wt %. The skilled artisan will understand that the foregoing ranges also include all fractions falling within these ranges, and that each of the lower ranges may be paired with the upper end ranges listed above.

In addition, the present invention relates to a coating composition containing photopolymerizable colorants of Formula I. Preferred coating substrates are thermoplastics, glass, wood, paper, metal and the like, particularly preferred thermoplastics are polyesters, acrylics and polycarbonate The functionalized dyes or colorants which contain vinyl or substituted vinyl groups are polymerizable or copolymerizable, preferably by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material which contains one or more vinyl or substituted vinyl groups.

The polymerizable vinyl compounds useful in the present invention contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated bisphenol A, ethoxylated and propoxylated neopentyl glycol; triacrylate and trimethacrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers which contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints*, Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. Another embodiment for the utilization of unsaturated polyesters that is known to the art involves the combination of the unsaturated polyester with monomers that contain two or more vinyl ether groups or two or more vinyl ester groups (WO 96/01283, WO 97/48744, and EP 0 322 808).

The coating compositions of the present invention optionally may contain one or more added organic solvents if desired to facilitate application and coating of the compositions onto the surface of substrates. Typical examples of suitable solvents include, but are not limited to ketones, alcohols, esters, chlorinated hydrocarbons, glycol ethers, glycol esters, and mixtures thereof. Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxy propionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, toluene, xylene and mixtures thereof. Preferred mixtures of solvents may include esters, ketones and aromatic solvents such as toluene, xylene, acetone, 2-pentanone, ethyl acetate and the like. The amount of added or extraneous solvent which may be present in our novel coating compositions may be in the range of about 1 to 40 weight percent, more typically about 1 to 25 weight percent, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent is optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 weight percent, preferably about 75 to about 90 weight percent of the total coating composition.

The coating compositions of the present invention contain one or more of the ethylenically unsaturated dye compounds described herein. The concentration of the ethylenically unsaturated dye compound or compounds may be from about 0.005 to about 40.0 weight percent but is preferably from about 0.5 to about 30, weight percent based on the weight of the polymerizable vinyl compound(s) present in the coating composition, i.e., component (i) of the coating compositions.

The coating compositions of the present invention normally contain a photoinitiator. The amount of photoinitiator typically is about 1 to 15 weight percent, preferably about 3 to about 5 weight percent, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl)propan-1-one (IRGACURE 907), alpha-hydroxyalkyl-phenones such as (1-hydroxycyclohexyl)(phenyl)methanone (IRGACURE 184), 2-benzyl-2-(dimethylamino)-1-(4-morpholinophenyl)butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVATONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)- phenylphosphine oxide (IRGANOX 819), IRGACURE 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose.

Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, Eastman 18-07, Eastman 18-92 and Eastman 18-99 from Eastman Chemical Company. Specific examples of additional additives can be found in *Raw Materials Index*, published by the National Paint & Coatings Association, 1500 Rhode Island Avenue, N.W., Washington, D.C. 20005.

As disclosed herein, the coating compositions of the present invention may be prepared as a result of a UV cure process but the method by which cure occurs is not a limiting aspect of the invention. One skilled in the art appreciates other free radical initiators such as peroxides and related compounds that decompose to give species that can initiate polymerization of unsaturated monomers such as methyl acrylate, hydroxyethyl methacrylate and the like.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats. Coating compositions within the scope of our invention may be applied to window films that may be suitable for automotive and architectural applications. Coating compositions within the scope of our invention may be applied to glass such as a fiber optic cable.

Various additional pigments, plasticizers, and stabilizers may be incorporated to obtain certain desired characteristics in the finished products. These are included in the scope of the invention.

Coating Examples

The coatings and coating compositions provided by the present invention and the preparation thereof are further illustrated by the following examples.

Example 42

This Example is a "control" experiment. A photopolymerizable composition consisting of 8.09 g Jägalux UV1500 polyester acrylate, 3.96 g of bisphenol A epoxy acrylate, 3.58 g dipropyleneglycol diacrylate (DPGDA), 2.83 g trimethylolpropane triacrylate (TMPTA), and 1.06 g of Darocure 1173 photoinitiator was prepared by mixing until the components were completely dispersed. The resulting coating composition was drawn down with a wire wound rod to provide a 4–10 micron thick wet coating on a 4"×4" glass plate, 4"×4" Spectar® (Eastman Chemical Company) plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated a hard coating was obtained (Table II). Chemical resistance was tested with MEK double rubs. The coating withstood more than 300 MEK double rubs.

Example 43

A colored, photopolymerizable composition was prepared by thoroughly mixing 0.2 g the red dye of Example 1 with a coating composition consisting of 8.89 g Jägalux UV1500 polyester acrylate, 4.25 g of bisphenol A epoxy acrylate, 3.62 g dipropyleneglycol diacrylate (DPGDA), 2.83 g trimethylolpropane triacrylate (TMPTA), and 1.01 g of Darocure 1173 photoinitiator until the components were completely dispersed. The resulting coating composition containing approximately 1% of the red dye was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated no significant loss of hardness due to incorporation of the dye (Table II). Chemical resistance was tested with MEK double rubs. Both the control (Examples 46–49), which contained no polymerizable dye, and the coatings, which contained polymerizable dyes (Examples 50–53), withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

Example 44

A colored, photopolymerizable composition was prepared by thoroughly mixing 0.2 g of the red dye of Example 41 with a coating composition consisting of 7.98 g Jägalux UV1500 polyester acrylate, 4.08 g of bisphenol A epoxy acrylate, 3.69 g dipropyleneglycol diacrylate (DPGDA), 2.84 g trimethylolpropane triacrylate (TMPTA), and 1.01 g of Darocure 1173 photoinitiator until the components were completely dispersed. The resulting coating composition containing approximately 1% of the red dye was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated no significant loss of hardness due to incorporation of the dye (Table II). Chemical resistance was tested with MEK double rubs. Both the control (Examples 46–49), which contained no polymerizable dye, and the coatings, which contained polymerizable dyes (Examples 54–57), withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

Example 45

A colored, photopolymerizable composition was prepared by thoroughly mixing 0.2 g of the red dye of Example 3 with a coating composition consisting of 7.98 g Jägalux UV1500 polyester acrylate, 4.08 g of bisphenol A epoxy acrylate, 3.69 g dipropyleneglycol diacrylate (DPGDA), 2.84 g trimethylolpropane triacrylate (TMPTA), and 1.01 g of Darocure 1173 photoinitiator until the components were completely dispersed. The resulting coating composition containing approximately 1% of the red dye was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated no significant loss of hardness due to incorporation of the dye (Table II). Chemical resistance was tested with MEK double rubs. Both the control (Examples 46–49), which contained no polymerizable dye, and the coatings, which contained polymerizable dyes (Examples 59–61), withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

Examples 46–61

Examples 46 through 61, which are set forth in Table II, reflect Konig Pendulum Hardness measurements for various coated substrates using the coatings in Examples 42 through 45.

TABLE II

Konig Pendulum Hardness Measurement Data for coated Substrates

| Example # | Substrate | Coating | Trial 1 | Trial 2 |
|---|---|---|---|---|
| 46 | aluminum | Example 42 | 231 | 231 |
| 47 | glass | Example 42 | 127 | 137 |
| 48 | rolled steel | Example 42 | 218 | 206 |
| 49 | Spectar ® | Example 42 | 243 | 245 |
| 50 | aluminum | Example 43 | 207 | 190 |
| 51 | glass | Example 43 | 110 | 108 |
| 52 | rolled steel | Example 43 | 191 | 193 |
| 53 | Spectar ® | Example 43 | 227 | 227 |
| 54 | aluminum | Example 44 | 138 | 158 |
| 55 | glass | Example 44 | 112 | 119 |
| 56 | rolled steel | Example 44 | 175 | 161 |
| 57 | Spectar ® | Example 44 | 224 | 227 |
| 58 | aluminum | Example 45 | 179 | 179 |
| 59 | glass | Example 45 | 113 | 112 |
| 60 | rolled steel | Example 45 | 172 | 173 |
| 61 | Spectar ® | Example 45 | 221 | 224 |

The invention has been described in detail with particular reference to preferred embodiments thereof, but it will be understood that variations and modifications can be effected within the spirit and scope of the invention.

We claim:

1. An anthraquinone colorant having the structure in Formula I:

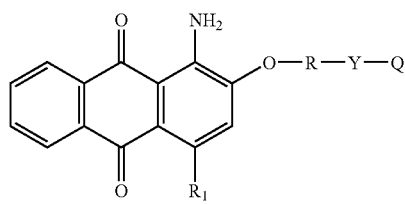

I wherein:
R is a divalent linking group selected from the group consisting of —$C_2$–$C_8$-alkylene-, —($C_2$–$C_4$-alkylene-Z)$_n$—$C_2$–$C_4$-alkylene-, —$C_2$–$C_6$-alkylene-O-arylene-O—$C_2$–$C_6$-alkylene-, -arylene-O—$C_1$–$C_6$-alkylene-, —$CH_2$-1,4-cyclohexylene-$CH_2$— and -arylene-$C_1$–$C_6$-alkylene-;

Z is —O—, —S—, —N(SO$_2$R$_4$)—, —N(R$_3$)CO— or —N(COR$_5$)—;
R$_1$ is —NHSO$_2$R$_2$ or NHCOR$_2$;
R$_2$ is C$_1$–C$_6$-alkyl, C$_3$–C$_8$-cycloalkyl or aryl;
Y is —O— or —N(R$_3$)—;
R$_3$ is hydrogen, C$_1$–C$_6$-alkyl, C$_3$–C$_8$-cycloalkyl or aryl;
R$_4$ is C$_1$–C$_6$-alkyl, C$_3$–C$_8$-cycloalkyl or aryl;
R$_5$ is C$_1$–C$_6$-alkyl, C$_1$–C$_6$-alkoxy, C$_3$–C$_8$-cycloalkyl or aryl;
n is an integer from 1 to 3; and
Q is an ethylenically unsaturated, photopolymerizable or free radical initiated polymerizable group.

2. A colorant according to claim 1 wherein Q is

1    —COC(R$_6$)=CH—R$_7$

2    —CONH—COC(R$_6$)=CH—R$_7$

3    —CONH—C$_1$-C$_6$-alkylene—OCOC(R$_6$)—CH=CH—R$_7$

4    —CO—C(R$_8$)(R$_9$)—NHCOC(R$_6$)=CH—R$_7$

5    —COCH=CH—CO$_2$R$_{10}$

6    —CO—C$_6$H$_4$—C(R$_6$)=CH$_2$

7    —CONHC(R$_8$)(R$_9$)—C$_6$H$_4$—C(R$_6$)=CH$_2$

8    —CH$_2$—C$_6$H$_4$—C(R$_6$)=CH$_2$

9    —CO—C$_6$H$_4$—N(maleimide with R$_{11}$)

10   —COCH$_2$C(=CH$_2$)CO$_2$R$_{10}$ and/or —COC(=CH$_2$)CH$_2$CO$_2$R$_{10}$ wherein:
R$_6$ is hydrogen or C$_1$–C$_6$-alkyl;
R$_7$ is hydrogen; C$_1$–C$_6$-alkyl; phenyl; phenyl substituted with one or more groups selected from the group consisting of C$_1$–C$_6$-alkyl, C$_1$–C$_6$-alkoxy, —N(C$_1$–C$_6$-alkyl), nitro, cyano, C$_1$–C$_6$-alkoxycarbonyl, C$_1$–C$_6$-alkanoyloxy and halogen; 1- or 2-naphthyl; 1- or 2-naphthyl substituted with C$_1$–C$_6$-alkyl or C$_1$–C$_6$-alkoxy; 2- or 3-thienyl; 2- or 3-thienyl substituted with C$_1$–C$_6$-alkyl or halogen; 2- or 3-furyl; or 2- or 3-furyl substituted with C$_1$–C$_6$-alkyl;
R$_8$ and R$_9$ are, independently, hydrogen, C$_1$–C$_6$-alkyl, or aryl; or R$_8$ and R$_9$ may be combined to represent a —[—CH$_2$—]$_{3-5}$— radical;
R$_{10}$ is hydrogen, C$_1$–C$_6$-alkyl, C$_3$–C$_8$-alkenyl, C$_3$–C$_8$-cycloalkyl or aryl; and
R$_{11}$ is hydrogen, C$_1$–C$_6$-alkyl or aryl.

3. A colorant according to claim 1 wherein Q is —COC(R$_6$)=CH$_2$ or

—CONH—C(CH$_3$)$_2$—C$_6$H$_4$—C(R$_6$)=CH$_2$ and wherein R$_6$ is hydrogen or methyl.

4. A colorant according to claim 1 wherein R is —C$_2$–C$_6$-alkylene-, —C$_2$–C$_4$-alkylene-O-arylene-O—C$_2$–C$_4$-alkylene-, —(C$_2$H$_4$O)$_n$—C$_2$H$_4$— or —CH$_2$-1,4-cyclohexylene-CH$_2$—; n is an integer selected from 1 to 3; R$_1$ is —NHSO$_2$R$_2$; Y is oxygen; and Q is

—CONH—C(R$_8$)(R$_9$)—C$_6$H$_4$—C(R$_6$)=CH$_2$ wherein R$_6$ is hydrogen or methyl and R$_8$ and R$_9$ are methyl.

5. A colorant according to claim 1 wherein R is —C$_2$–C$_6$-alkylene-, —C$_2$–C$_4$-alkylene-O-arylene-O—C$_2$–C$_4$-alkylene-, —(C$_2$H$_4$O)$_n$—C$_2$H$_4$— or —CH$_2$-1,4-cyclohexylene-CH$_2$—; n is an integer from 1 to 3; R$_1$ is —NHSO$_2$R$_2$; Y is oxygen; and Q is —COC(R$_6$)=CH—R$_7$ wherein R$_6$ is hydrogen or methyl and R$_7$ is hydrogen.

6. A colorant having the structure

[1-amino-4-hydroxy-anthraquinone-2-yl-O-CH$_2$CH$_2$-O-C$_6$H$_4$-O-CH$_2$CH$_2$-O-C(=O)-NH-C(CH$_3$)$_2$-C$_6$H$_4$-C(CH$_3$)=CH$_2$].

7. A colorant having the structure

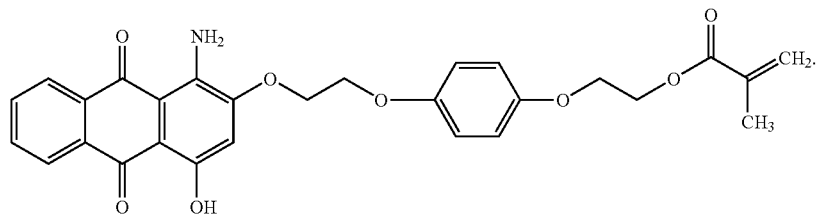

8. A coating composition comprising (i) one or more polymerizable vinyl compounds, (ii) one or more of the colorant compounds according to claim 1, and (iii) at least one photoinitiator.

9. A coating composition according to claim 8 comprising (i) one or more polymerizable vinyl compounds, (ii) one or more of the colorant compounds present in a concentration of about 0.5 to 25 wt % based on the weight of component (i), and (iii) a photoinitiator present in a concentration of about 1 to 15 wt % based on the weight of the polymerizable vinyl compound(s) present in the coating composition.

10. A coating composition according to claim 9 which further comprises one or more organic solvents.

11. A coating composition according to claim 9 wherein the composition is dispersed in water.

12. A composition according to claim 11 which further comprises a co-solvent.

13. A coating composition according to claim 9 wherein the polymerizable vinyl compounds comprise a solution of a polymeric, polymerizable vinyl compound selected from acrylated or methacrylated polyesters, acrylated or methacrylated polyethers, acrylated or methacrylated epoxy polymers, acrylated or methacrylated urethanes, or mixtures thereof, in a diluent selected from monomeric acrylate or methacrylate esters.

14. A colorant concentrate comprising a solvent and a colorant according to claim 1 at a concentration of about 0.5 to about 40 wt %.

15. A colorant concentrate according to claim 14 wherein the solvent is toluene, methylethyl ketone, acetone, hexanediol diacrylate, tri(propyleneglycol) diacrylate or a mixture thereof and the colorant is present at a concentration of about 10 to about 30 wt %.

16. A colorant concentrate according to claim 15 futher comprising one or more ultraviolet light absorbing compounds at a concentration of from about 0.1 to about 30 wt %.

17. A colorant concentrate according to claim 15 further comprising one or more antioxidants at a concentration of about 0.01 to about 5 wt %.

* * * * *

UNITED STATES PATENT AND TRADEMARK OFFICE
CERTIFICATE OF CORRECTION

PATENT NO. : 7,105,688 B2  Page 1 of 1
APPLICATION NO. : 10/647828
DATED : September 12, 2006
INVENTOR(S) : Pearson et al.

It is certified that error appears in the above-identified patent and that said Letters Patent is hereby corrected as shown below:

Column 20, lines 37-45, the portion of the formula reading: -CONH-C

Should read as follows: -CONH C

Signed and Sealed this

Twenty-sixth Day of February, 2008

JON W. DUDAS
*Director of the United States Patent and Trademark Office*